United States Patent [19]
Coleman

[11] 3,790,801
[45] *Feb. 5, 1974

[54] APPARATUS FOR ULTRAVIOLET LIGHT TREATMENT IN A CONTROLLED ATMOSPHERE

[75] Inventor: George E. Coleman, Elmhurst, Ill.

[73] Assignee: PPG Industries, Inc., Pittsburgh, Pa.

[ * ] Notice: The portion of the term of this patent subsequent to July 11, 1989, has been disclaimed.

[22] Filed: Sept. 8, 1972

[21] Appl. No.: 287,400

[52] U.S. Cl.............. 250/453, 250/432, 250/455, 250/492

[51] Int. Cl. ............................................ H01j 37/20

[58] Field of Search... 73/150; 118/49.1, 49.5, 50.1, 118/620; 250/42, 49.5 TE, 51, 52

[56] References Cited
UNITED STATES PATENTS

| | | | |
|---|---|---|---|
| 2,876,187 | 3/1959 | Wolinski | 250/42 X |
| 3,676,673 | 7/1972 | Coleman | 250/49.5 |
| 1,969,606 | 8/1934 | Hall | 73/150 |
| 3,224,266 | 12/1965 | Klippert | 73/150 |
| 2,575,426 | 11/1951 | Parnell | 250/52 X |
| 2,845,541 | 7/1958 | Berry et al. | 250/52 |
| 2,887,584 | 5/1959 | Nygard | 250/49.5 |

*Primary Examiner*—William F. Lindquist
*Attorney, Agent, or Firm*—George D. Morris

[57] ABSTRACT

Apparatus which permits treatment of products with ultraviolet light in a controlled atmosphere comprises an inner chamber positioned within an outer chamber, the workpiece to be treated passing through the inner chamber. The outer chamber has a means for supplying ultraviolet light in the upper surface of a second or inner chamber whereby ultraviolet light may be radiated in the inner or second chamber. The apparatus may also contain means for carrying the product to be treated, as well as cooling means at either end of the path of treatment.

11 Claims, 3 Drawing Figures

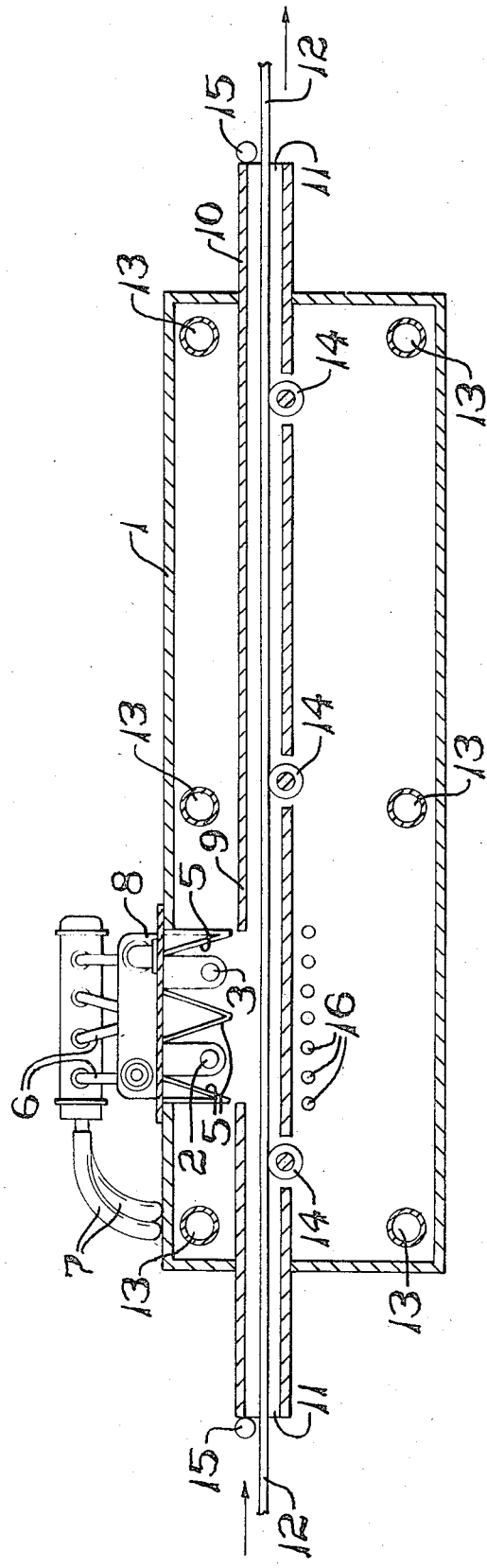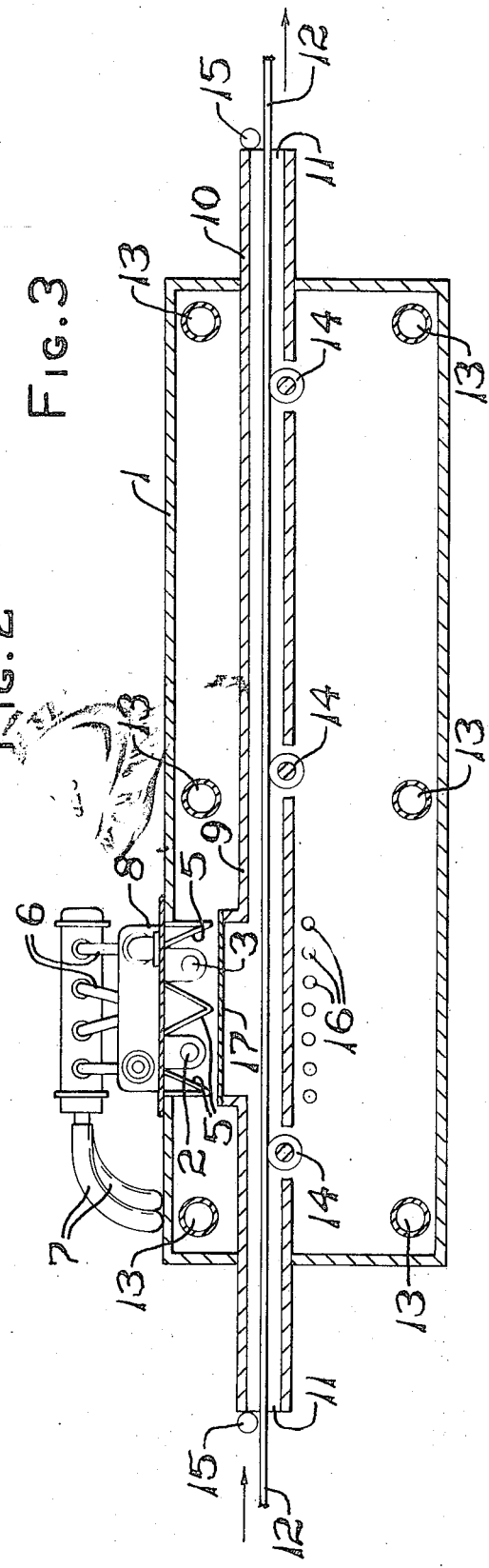

APPARATUS FOR ULTRAVIOLET LIGHT TREATMENT IN A CONTROLLED ATMOSPHERE

BACKGROUND OF THE INVENTION

The ultraviolet light treatment of materials to effect curing, sterilization, etc., is known in the art, and processes involving ultraviolet light are becoming of increasing importance. The application and curing of coatings is one area in which radiation with ultraviolet light provides numerous advantages. Irradiation processes are carried out by treating ultraviolet light sensitive materials to light, at least part of which has a wavelength in the ultraviolet region.

The use of ultraviolet light in treating various materials is carried out by exposing appropriately sensitive materials to light, at least part of which has a wavelength in the ultraviolet region. The ultraviolet region is usually considered to extend from about 4,000 A. down to as low as 40 A., although for practical purposes the region below about 2,000 A. is not ordinarily significant. While sunlight includes wavelengths in the ultraviolet region, as received it has little or no light at wavelengths much below 3,000 A. due to absorption by the atmosphere. Thus, for useful processes it is necessary to use an ultraviolet lamp.

Several types of lamps are used to produce ultraviolet light. Mercury lamps, in which an electric discharge is passed through mercury vapor, are the most common, but others include metal halide lamps, luminescent or fluorescent lamps, etc. The so-called "Sunlamps" can also be employed.

It has been found that the efficiency of ultraviolet light in treating materials in many cases depends upon the environment of the material being treated. For example, many materials are more or less sensitive to ultraviolet light, depending upon the atmosphere in which they are located. The presence of certain levels of oxygen in the atmosphere is often a determining factor in both the rate of the desired reaction and the quality of the finished product. Other factors involve hazards such as the possibility of fire or explosion and the production of ozone during the treatment process.

It is, therefore, often desirable to carry out treatment with ultraviolet light in a controlled atmosphere in which the level of oxygen can be maintained within desired limits. While this is relatively easily carried out in a closed system, most processes cannot be economically performed in closed apparatus and heretofore it has not been possible to provide efficient control of the atmosphere surrounding a workpiece in a process wherein the products treated are continuously or intermittently moving.

One proposal for providing an inert atmosphere, suggested for use in a process involving electron beam irradiation, is described in U.S. Pat. No. 2,887,584. The apparatus as described therein comprises a chamber open at the bottom into which the product to be irradiated is passed while attempting to maintain a relatively inert atmosphere inside the chamber by use of a lighter-than-air inert gas to displace the air therein. The apparatus as described in the said patent is quite limited in the extent to which oxygen can be excluded from the path of the product to be irradiated, and for this reason does not appear to have been successfully utilized.

The apparatus of the present invention comprises:

A. a first chamber having at least one ultraviolet lamp in a surface thereof,

B. a second chamber positioned within the first chamber and defining a reservoir between the chambers, C. the second chamber having spaced inlet and outlet openings establishing a path of travel for a workpiece and said second chamber containing means for the passage of ultraviolet light to the second chamber in the upper surface of the second chamber and said first and second chambers substantially completely enclosing said path of travel between said inlet and outlet openings, and D. means for introducing gas into the path of travel of the workpiece.

The present invention provides apparatus for treating products with ultraviolet light in an atmosphere in which the level of oxygen or any other gaseous component can be controlled within quite rigid limits. For example, where it is desired to exclude oxygen to the extent possible, the present apparatus can easily attain oxygen levels in the path of travel of a workpiece as low as 100 parts per million or lower, even where workpieces are being continuously irradiated and thus are continuously moving through the apparatus.

DESCRIPTION OF THE DRAWINGS

In the drawings:

FIG. 2 is a longitudinal section through the apparatus shown in FIG. 1.

FIG. 3 is a longitudinal section through the apparatus which is another embodiment of the invention.

Referring to FIG. 1 the first or outer chamber 1 has in the bottom surface thereof two ultraviolet lamps 2 and 3, lamp 2 being a mercury lamp and lamp 3 being a metal halide lamp. Although only 2 lamps are shown, one or more lamps may be used depending on the energy desired. The lamps are interchangeably connected to the electrical source through connectors 4 and 4'. Separating the lamps are reflectors 5 which are cooled by cooling lines 6 which contact the reflectors and contain circulating water from water lines 7 and manifolds 8. The ultraviolet lamps extend through the top surface of outer chamber 1 and the bulbs of the lamps are situated with the reflectors in the upper surface 9 of inner chamber 10. The second chamber 10 is positioned within the first chamber and has openings 11 and 11' through which is passing a workpiece 12. Gas distribution tubes 13 are positioned in the reservoir between the chambers and are connected to a gas source (not shown). Also shown is an auxiliary gas inlet 15 at the inlet opening to the second chamber.

In FIG. 2 the first chamber 1 with the ultraviolet lamps 2 and 3 contains within it a second chamber 10 having inlet and outlet openings 11 and 11'. The bulbs of the ultraviolet lamps and the reflectors 5 extend to the upper surface 9 of chamber 10. Gas inlet tubes 13 extend transversely through the apparatus and contain a plurality of holes therein for the introduction of gas, the distribution of the gas being shown in the drawing by arrows. Conveyor rollers 14 which assist in passing the workpiece are in the lower surface of the second chamber and cooling tubes 16 provide cooling of the bottom surface of the second chamber in the path of the ultraviolet light. At each of the openings in the second chamber, a gas distribution tube 15 is provided, also extending transversely across the opening and having a plurality of holes for the passage of gas.

In FIG. 3 the apparatus of FIGS. 1 and 2 is shown wherein the bulbs for the ultraviolet lamps and the reflectors do not form part of the surface of inner chamber 10 but a window 17 for passing ultraviolet light is provided at surface 9. Thus, the first chamber 1, with the ultraviolet lamps 2 and 3 contains within it a second chamber 10 having inlet and outlet openings 11 and 11'. Ultraviolet light transmitting window 17 in the second chamber is in juxtaposition with the ultraviolet lamps 2 and 3 and allows the ultraviolet light to travel to the workpiece 12. Gas inlet tubes 13 extend transversely through the apparatus and contain a plurality of holes therein for the introduction of gas, the distribution of the gas being shown in the drawing by arrows. Conveyor rollers 14 are in the lower surface of the inner chamber and cooling tubes 16 provide cooling of the bottom surface of the inner chamber in the path of the ultraviolet light. At each of the openings in the inner chamber, a gas distribution tube 15 is provided, also extending transversely across the opening and having a plurality of holes for the passage of gas.

DESCRIPTION OF THE PREFERRED EMBODIMENTS

Figure 1:
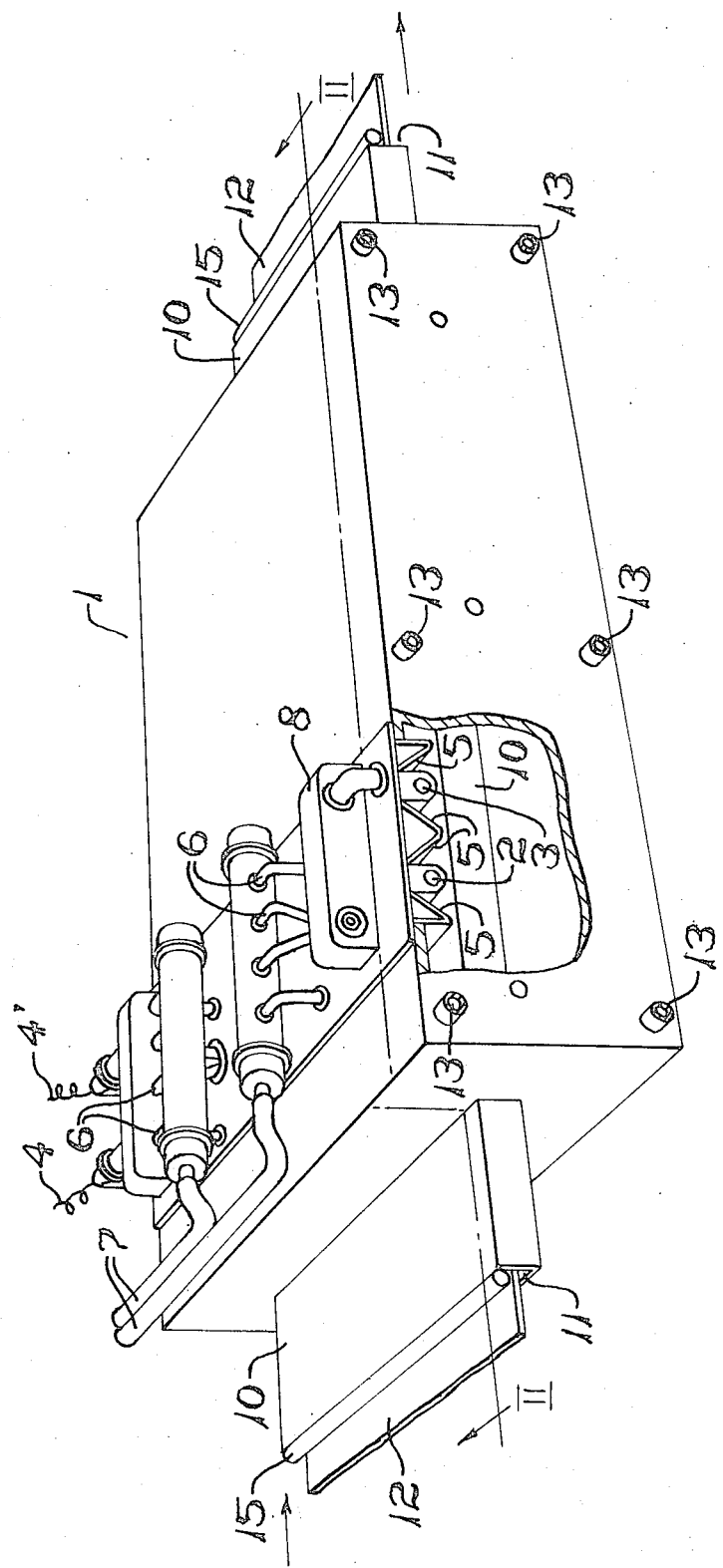
FIG. 1 is a perspective view of an apparatus comprising one embodiment of the invention.

The first or outer chamber of the apparatus can be of any suitable size or shape depending upon the nature of the product or workpiece to be treated. It is usually rectangular in shape with the ultraviolet lamps attached to the inside surface. The lamps employed can be any of the commercially available lamps which emit light in the ultraviolet region, preferably one which emits predominantly in the range of 2,000 A. to 4,000 A. Mercury vapor and metal halide vapor lamps are generally utilized. The distance from the lamp to the workpiece is not ordinarily critical within reasonable limits, and the optimum distance varies with the intensity of the ultraviolet light, the nature and size of the material treated, the speed with which the workpiece is carried through the ultraviolet light zone, and similar factors. In the apparatus illustrated, the lamps are located about 1 to 16 inches from the conveyor. It is not always necessary that the lamps be within the chamber in which the workpiece is treated. However, where the lamp is located outside the chamber, a suitable window made of a material which transmits ultraviolet light, such as quartz should be used so as to permit the ultraviolet light to impinge on the desired portion of the path of travel of the product being treated.

In some instances, the ultraviolet lamps in the outer chamber can be part of a common surface with the inner chamber. Such an arrangement has the advantage of eliminating windows and thus reduces the loss of ultraviolet light occasioned thereby, but also makes the apparatus less flexible.

The second or inner chamber is positioned within the first chamber, thereby defining a reservoir between the inner surface of the first chamber and the outer surface of the second chamber. While it is desirable that the second chamber be of a size such that the height above the surface of the workpiece is minimized, its size is also not critical. However, the distance the light must travel before meeting the surface of the workpiece affects the distribution of energy in the product treated. The volume of the reservoir thus depends upon the number and type of gas inlets, the flow rate of gas, and the overall dimensions of the components of the apparatus.

The second chamber has openings establishing the path of travel for the workpiece. Ordinarily, these openings are at either end of the second chamber and the path of travel passes through the chamber and beneath the path of the ultraviolet light. The area of these inlet and outlet openings should be as low as possible to permit the passage of the workpieces, and the larger the area of the inlet and outlet, the longer the path of travel through the second chamber should be. The object is to provide a stable condition inside the second chamber, thereby minimizing differences due to external changes in atmosphere, such as caused by air movements. The dimensions of the openings can be varied depending upon size and shape of the workpiece; the shape of the opening can be regular or irregular as required. Replaceable or moveable openings of different configurations can be provided if desired.

The apparatus also comprises means for the introduction of gas into the path of travel of the workpiece. This is usually accomplished by providing a plurality of gas inlets in the reservoir between the chambers and then providing means for the passage of the gas into the second chamber. Where the second chamber contains an opening for the passage of the ultraviolet light, this can serve as one of or the only means for the gas to enter the second chamber. Alternatively, the gas can be introduced into the second chamber, although this is less desirable, or an opening or other passageway can be provided in the second chamber at some point other than the point at which the ultraviolet light enters the second chamber.

The number and arrangement of inlets for the introduction of gas and direction of flow of the gas can be varied, and in fact, it has been found that different types of processes require different arrangements. Therefore, it is desirable to provide a plurality of such inlets and that means be provided so that the direction of gas flow can be varied. It is further desirable that these inlets be based at various points throughout the reservoir. Thus, the preferred arrangement is a series of gas distribution tubes spaced in the reservoir and extending transversely through the apparatus, these gas distribution tubes having a plurality of inlet holes along their length and being rotatable, thus permitting changing the direction of flow. A manifold connected to a gas source is usually employed to provide a uniform gas pressure to each of the gas distribution tubes.

As indicated, the overall size of the apparatus can be varied. The apparatus can be constructed of any material which is not overly sensitive to ultraviolet light, i.e., which does not substantially degrade and become unusable when subjected to the type of light employed. Most metals, glass, plastic, etc., can be used. It is preferred that a noncorrosive material be utilized and stainless steel is the specifically preferred material of construction.

The apparatus can also be provided with certain optional components. Means for conveying the workpiece along the path of travel can be included, these being, for example, rollers located in the lower portion of the second or inner chamber; these can be power-driven if desired. It is also desirable to include cooling means in the area of the second chamber upon which the ultraviolet light impinges when not entirely absorbed by any material being treated. Such cooling means can be tubes filled with circulating fluid, a block of heat-conducting material, a water or other reservoir, or any other means which permits absorption and/or transfer of heat.

Other auxiliary equipment which is often desirable include means for introducing gas at the inlet and outlet; these can be gas distribution tubes similar to those located in the reservoir, placed above the opening with gas flow directed downward, preferably at 45° angle. Still other optional features include provision for continuously or periodically analyzing the atmosphere inside the chamber, means for viewing the workpiece, such as cameras, etc., vacuum or other pumps, and the like.

The apparatus can be varied in structure to meet the needs of specific processes in which it is employed. For example, the apparatus can be used in conjunction with more than one source of ultraviolet light by providing a plurality of lamps as required. For example, both sides of a workpiece can be exposed, if desired, or a workpiece of complex shape can be treated from various angles.

In one embodiment of the invention, an apparatus as shown in the drawings comprises a first or outer chamber 21 inches long. Attached to the top inner surface are two ultraviolet lamps, each 12 inches long, one a Sylvania mercury vapor lamp rated at 330 watts per inch and the other a Sylvania metal halide seeded mercury vapor lamp rated at 330 watts per inch. The lamps are arranged so that either or both can be used at any one time. Each lamp has a polished aluminum reflector, each reflector having attached a coil through which cooling water is circulated when the lamps are in operation. The lamps are spaced from about 1 inch to 16 inches from the conveyor which passes beneath the lamps and through the chamber, depending upon the spacer employed. The second or inner chamber is 55 inches long, 14 inches wide and 2 inches deep. Each of the inlet and outlet openings in the second chamber is 14 inches wide by 2 inches high and the upper surface of the second chamber comprising the bulbs of the ultraviolet lamps surrounded by a foraminous panel. Eight gas distribution tubes positioned above and below the second chamber in the reservoir area extend transversely through the apparatus; the tubes are rotatable and each tube has 1 hole per inch therein, each hole being 0.090 inch in diameter. The tubes are connected to a manifold which is in turn connected to a source of nitrogen. A conveyor is used to pass the workpiece through the second chamber with three power-driven rollers in the bottom of the second chamber aiding in the passage.

The apparatus as described is constructed of stainless steel and can accommodate workpieces up to about 12 inches wide and about 1 inch thick.

In operation of the above-described apparatus, a total nitrogen flow of 60 cubic feet per minute is passed through the manifold and distributed by the gas distribution tubes in the reservoir. A product line is carried through the second chamber at a rate of about 150 feet per minute. During such operation, the concentration of oxygen in the path of travel of the workpiece is less than 150 parts per million. By reducing the speed of travel and/or the size of the product line, the oxygen content can be reduced to below 60 parts per million.

The apparatus can also be used to provide a sustained level of oxygen (or other gas) during operation. This is desirable using some coating materials, for example, and is accomplished by feeding a controlled mixture of oxygen and nitrogen through the gas distribution system. An advantage of the use of the apparatus in this manner is that ozone and other gaseous by-products are removed during operation and thus the concentration of such by-products does not build up to undesirably high levels. The apparatus can also be operated at reduced pressure, by providing suitable auxiliary equipment, e.g., pumps, chambers, etc.

According to the provisions of the patent statutes, there are described above the invention and what are now considered to be its best embodiments. However, with the scope of the appended claims, it is to be understood that the invention can be practiced otherwise than as specifically described.

I claim:
1. In an apparatus for treating products with ultraviolet light in a controlled atmosphere
   A. a first chamber having at least one ultraviolet lamp in a surface thereof,
   B. a second chamber positioned within said first chamber and defining a reservoir between said chambers,
   C. said second chamber having spaced inlet and outlet openings for a workpiece establishing a path of travel for said workpiece and having means for the passage of ultraviolet light in juxtaposition with said ultraviolet lamp,
   D. said first and second chambers substantially completely enclosing said path of travel between said inlet and outlet openings, and
   E. means for introducing gas into said path of travel.

2. The apparatus of claim 1 in which said second chamber extends through said first chamber.

3. The apparatus of claim 1 in which said means for introducing gas comprises means for introducing gas into said reservoir.

4. The apparatus of claim 1 in which said means for the passage of ultraviolet light in said second chamber is a window in one surface of said chamber.

5. The apparatus of claim 1 in which said means for the passage of ultraviolet light in said second chamber is the extension of the lamps so that the bulbs of the lamps form part of a surface of said second chamber.

6. The apparatus of claim 1 in which cooling means is provided in a portion of the surface of said second chamber.

7. The apparatus of claim 1 in which said means for introducing gas comprises a plurality of gas distribution tubes.

8. The apparatus of claim 1 in which additional means for the introduction of gas are provided at the said inlet and outlet openings in said second chamber.

9. The apparatus of claim 1 in which means for conveying the workpiece along said path of travel is provided in the lower surface of said second chamber.

10. The apparatus of claim 9 in which said means for conveying the workpiece comprises rollers.

11. The apparatus of claim 1 in which said means for the passage of ultraviolet light in said second chamber is an opening in the surface of said chamber.

* * * * *